United States Patent [19]

Abe et al.

[11] Patent Number: 5,296,273
[45] Date of Patent: Mar. 22, 1994

[54] COATING METHOD FOR POLYPROPYLENE RESIN MOLDINGS

[75] Inventors: Hiroomi Abe; Hideo Shinonaga; Kyoji Suzuki; Satoru Sogabe, all of Chiba, Japan

[73] Assignee: Sumitomo Chemical Company, Limited, Osaka, Japan

[21] Appl. No.: 794,881

[22] Filed: Nov. 20, 1991

[30] Foreign Application Priority Data

Nov. 20, 1990 [JP] Japan .................. 2-316722

[51] Int. Cl.$^5$ .................. B05D 3/06; B05D 3/02; B05D 1/36; B05D 7/26
[52] U.S. Cl. .................. 427/553; 427/520; 427/508; 427/393.5; 427/412.3
[58] Field of Search .................. 427/53.1, 407.1, 385.5, 427/393.5, 508, 520, 553, 558, 412.3, 412.4

[56] References Cited

U.S. PATENT DOCUMENTS

| | | | |
|---|---|---|---|
| 3,600,289 | 8/1971 | Bragole | 204/159.14 |
| 4,751,103 | 6/1988 | Goel | 427/54.1 |
| 4,778,724 | 10/1988 | Bragole | 427/54.1 |
| 4,904,328 | 2/1990 | Beecher et al. | 427/54.1 |
| 5,077,082 | 12/1991 | Katoh et al. | 427/54.1 |
| 5,132,131 | 7/1992 | Katoh et al. | 427/54.1 |
| 5,139,817 | 8/1992 | Abe et al. | 427/54.1 |
| 5,200,122 | 4/1993 | Katoh et al. | 427/558 |

FOREIGN PATENT DOCUMENTS

| | | |
|---|---|---|
| 0103993 | 3/1984 | European Pat. Off. |
| 1136199 | 12/1968 | United Kingdom |
| 2050200 | 1/1981 | United Kingdom |

*Primary Examiner*—Marianne Padgett
*Attorney, Agent, or Firm*—Sughrue, Mion, Zinn, Macpeak & Seas

[57] ABSTRACT

A method for coating a polypropylene resin molding is disclosed, comprising irradiating the surface of a molding of a polypropylene resin selected from a polypropylene and a propylene-ethylene block copolymer with an ultraviolet light having an irradiating wavelength in the region of 300 nm or less, coating the irradiated surface with a primer, and further coating the coated surface with a coating material. A method for coating a polypropylene resin molding is also disclosed, comprising coating the surface of a molding of a polypropylene resin selected from a polypropylene and a propylene-ethylene block copolymer with a primer, irradiating the coated surface with an ultraviolet light having an irradiating wavelength in the region of 300 nm or less, and further coating the irradiated surface with a coating material.

1 Claim, No Drawings

COATING METHOD FOR POLYPROPYLENE RESIN MOLDINGS

FIELD OF THE INVENTION

The present invention relates to a coating method of polypropylene resin moldings which can be molded by injection molding, extrusion molding, etc., and can be utilized as sheets, films, etc.

BACKGROUND OF THE INVENTION

Since polypropylene has excellent properties such as moldability, toughness, water resistance, gasoline resistance, and chemical resistance, has a low specific gravity, and is cheap, it has hitherto been widely used as various moldings, films, sheets, etc.

However, polypropylene has difficulties or points to be improved in heat resistance, rigidity, impact resistance, scratch resistance, coating properties, adhesion, printability, etc., and they become an obstacle for developing new uses.

Among them, the points to be improved in the coating properties, adhesion, printability, etc., the method for graft modification of a part or the whole of polypropylene with an unsaturated carboxylic acid or an anhydride thereof such as maleic anhydride is described in, e.g., JP-B-58-47418 (the term "JP-B" as used herein means an "examined Japanese patent publication") and JP-A-58-49736 (the term "JP-A" as used herein means an "unexamined published Japanese patent application").

However, even in the case of using such modified polypropylene, the impact resistance, heat resistance, rigidity, and other physical properties are not essentially improved.

Also, for improving the compatibility between polypropylene and an adhesive and/or a coating material, a medium which is a so-called primer composed of chlorinated polypropylene and toluene known as a typical composition is usually used as an intermediate layer between them.

However, in the case of coating a primer, a surface treatment such as washing with a vapor of a halogenated hydrocarbon solvent such as 1,1,1-trichloroethane is usually required before coating. However, the use of 1,1,1-trichloroethane is being regulated by an ozone problem which is one of the recent environmental pollutions.

In general, in the case of coating with a coating material after coating a polypropylene resin with a primer, sufficient adhesion is not obtained when no surface treatment with a halogenated hydrocarbon is applied.

Also, a method for improving the coating properties of a polypropylene resin molding by irradiating the surface of the molding with an ultraviolet light for improving the surface thereof is proposed in JP-A-59-147027.

However, such a method by the irradiation with an ultraviolet light, sufficient adhesion is not obtained in the case of coating the molding with a coating material.

SUMMARY OF THE INVENTION

An object of the present invention is to provide a coating method for polypropylene resin moldings having very excellent coating properties and being capable of using a primer by an ultraviolet light irradiation method without applying a surface treatment with a halogenated hydrocarbon.

As the result of various investigations for achieving the aforesaid object, it has been discovered that the coating properties of a polypropylene resin are greatly improved by irradiating the surface of a polypropylene resin molding with an ultraviolet light having a main wavelength in the region of 300 nm or less, before or after coating the molding with a primer, leading to accomplishment of the present invention.

That is, the present invention provides a coating method of polypropylene resin moldings, which comprises irradiating the surface of a molding of a polypropylene resin selected from a polypropylene and a propylene-ethylene block copolymer with an ultraviolet light having an irradiating wavelength in the region of 300 nm or less, coating the irradiated surface with a primer, and further coating the coated surface with a coating material. Also, the present invention provides a coating method of polypropylene resin moldings, which comprises irradiating the surface of the foregoing molding with an ultraviolet light after coating it with a primer and further coating the irradiated surface with a coating material.

DETAILED DESCRIPTION OF THE INVENTION

Then, the invention is described in detail.

(A) Polypropylene Resin

The polypropylene resin which is used in the present invention is a resin selected from a polypropylene and a propylene-ethylene block copolymer.

In the present invention, the polypropylene means crystalline polypropylene and includes not only a homopolymer of propylene but random copolymers obtained by copolymerizing propylene with from 1 to 30% by weight of an α-olefin such as ethylene and butene-1.

Also, in the present invention, the propylene-ethylene block copolymer means a propylene-ethylene block copolymer having an ethylene content of from 1 to 40% by weight.

The polypropylene resin for use in the present invention ion preferably has a melt index in the range of from 0.1 to 100 g/10 min., and particularly from 0.5 to 40 g/10 min..

The polypropylene resin for use in the present invention can be obtained by reacting propylene or propylene and other monomer in the presence of a so-called Ziegler-Natta type catalyst, i.e., a combination of titanium trichloride and an alkylaluminum compound.

In the present invention, a modified polypropylene resin obtained by graft modifying a homopolymer of propylene, a random copolymer of propylene or a propylene-ethylene block copolymer with an unsaturated carboxylic acid or an anhydride thereof in an amount ranging from 0.05 to 20% by weight, and preferably from 0.1 to 10% by weight can be used.

As the graft monomer in the modified polypropylene resin graft-modified with an unsaturated carboxylic acid or an anhydride thereof, acrylic acid, methacrylic acid, maleic acid, itaconic acid, maleic anhydride, itaconic anhydride, etc. can be used. In these monomers, maleic anhydride is particularly preferred.

For grafting the graft monomer to the polypropylene resin, various known methods can be employed.

For example, a method for mixing the polypropylene resin with the graft monomer and a radical generating agent and melt kneading the mixture in an extruder to effect grafting, a method for dissolving the polypropylene resin in an organic solvent such as xylene, adding thereto a radical generating agent, followed by carrying out the reaction by heating with stirring in a nitrogen gas atmosphere, and after the reaction is over, cooling, washing, filtering, and then drying the reaction product to obtain a grafted polypropylene resin, a method for irradiating the polypropylene resin with an ultraviolet light or radiations in the presence of a graft monomer, and a method for contacting the propylene resin with oxygen or ozone can be employed.

The foregoing polypropylene resin can further contain a rubbery material or a modified rubbery material for improving the impact resistance, in particular, low-temperature impact resistance.

Also, for improving the heat resistance, an inorganic filler or glass fibers can be added to the polypropylene resin.

Then, the rubbery material and the modified rubbery material are explained.

(B) Rubbery Material and Modified Rubbery Material

Examples of the rubbery material include ethylenic copolymer rubbers, propylene-butene rubbers, isoprene-butylene rubbers, polyisoprene, polybutadiene, styrenic block copolymers (e.g., styrene-butadiene rubbers, styrene-butadiene-styrene block copolymers, partially hydrogenated styrene-butadiene block copolymers, partially hydrogenated styrene-butadiene-styrene block copolymer, styrene-isoprene block copolymers, partially hydrogenated styrene-isoprene block copolymers), linear low-density polyethylene, and compoundings thereof.

Examples of the ethylenic copolymer rubbers which can be used include ethylene-α-olefin copolymer rubbers and ethylene-α-olefin-non-conjugated diene copolymer rubbers typified by ethylene-propylene copolymer rubbers (hereinafter referred to as EPM) and ethylene-propylene-non-conjugated diene copolymer rubbers (hereinafter referred to as EPDM) as well as ethylene-vinyl acetate copolymers, ethylene-methyl (meth)acrylate copolymers, ethylene-ethyl (meth)acrylate copolymers, ethylene-butyl (meth)acrylate copolymers, ethylene-(meth)acrylic acid copolymers or partial metal salt copolymers thereof, ethylene-(meth)acrylic acid-(meth)acrylic acid ester copolymers, ethylene-vinyl alcohol copolymers, ethylene-vinyl acetate-vinyl alcohol copolymers, and ethylene-styrene copolymers.

These ethylenic copolymer rubbers may be used as a mixture of two or more thereof. Also, the ethylenic copolymer rubbers can be used as a mixture with low-density polyethylene or high-density polyethylene having good compatibility therewith.

Also, the modified rubbery material is obtained by graft copolymerizing an unsaturated carboxylic acid or a derivative thereof, or an unsaturated carboxylic acid or a derivative thereof and an unsaturated monomer, to the foregoing rubbery material in the optional presence of a radical initiator, or directly copolymerizing an unsaturated carboxylic acid or a derivative thereof in a main chain of the α-olefin in the presence of a polymerization initiator and a catalyst.

As the rubbery material and the rubbery material as the raw material for the modified rubbery material, ethylenic copolymers or styrenic block copolymers are suitably used.

Of the ethylenic copolymer rubbers are particularly preferred ethylene-α-olefin copolymer rubbers and ethylene-α-olefin-non-conjugated diene copolymer rubbers. The ethylene-α-olefin copolymer rubbers include copolymers of ethylene and other α-olefin such as propylene, 1-butene, 1-pentene, 1-hexene, 4-methyl-1-pentene, and 1-octene, and terpolymer rubbers such as ethylene-propylene-1-butene copolymers. Among them are preferred ethylene-propylene copolymer rubbers and ethylene-1-butene copolymer rubbers. Also, ethylene-α-olefin-non-conjugated diene copolymer rubbers can be used and in this case, it is preferable that the content of the non-conjugated diene in the raw material rubber is not more than 3% by weight. If the content of the non-conjugated diene is over 3% by weight, undesirable gelation likely occurs at kneading.

The content of ethylene in the ethylene-α-olefin copolymer rubber is from 15 to 85% by weight, and preferably from 40 to 80% by weight. That is, a highly crystalline copolymer having an ethylene content of more than 85% by weight is undesirable since working thereof is difficult under an ordinary rubber molding condition, while the copolymer having an ethylene content of less than 15% by weight is also undesirable since the glass transition temperature (Tg) is increased to likely lose the rubbery nature.

Also, the number average molecular weight of the ethylene-α-olefin copolymer rubber is preferably one such that the copolymer rubber can be kneaded in an extruder and is from 10,000 to 100,000. Too a low molecular weight makes handling in feeding to an extruder difficult. Too a high molecular weight reduces fluidity, making processing difficult.

There is no particular restriction on the molecular weight distribution of the ethylene-α-olefin copolymer rubber for use in the present invention and usually produced, commercially available copolymer rubbers having various molecular weight distributions such as a monomodal type and a bimodal type can be used.

A preferred range of the Q value (a ratio of the weight average molecular weight to the number average molecular weight) of the molecular weight distribution is from 1 to 30, and more preferably from 2 to 20.

That is, the copolymer rubber is a copolymer rubber produced by using a so-called Ziegler-Natta catalyst which is generally used for the production, and as the catalyst, a combination of, for example, organoaluminum compounds and from trivalent to pentavalent vanadium compounds, etc., can be used.

As the foregoing aluminum compound, alkylaluminum sesquichlorides, trialkylaluminums, dialkylaluminum monochlorides, and mixtures thereof can be used. Also, as the vanadium compound, vanadium oxytrichloride, vanadium tetrachloride, and vanadate compounds represented by $VO(OR^1)_q X_{3-q}$ (wherein $0 < q \leq 3$, and $R^1$ represents a straight chain, branched or cyclic hydrocarbon group having from 1 to 10 carbon atoms) can be used.

Of the foregoing styrenic block copolymers are particularly preferred partially hydrogenated styrene-butadiene-styrene block copolymers. The partially hydrogenated styrene-butadiene-styrene block copolymers are produced by a partial hydrogenation treatment of a styrene-butadiene-styrene block copolymer, and the structure and production method thereof are described below.

In the partially hydrogenated styrene-butadiene-styrene block copolymers, the number average molecular weight of the block copolymer rubber is from 10,000 to 1,000,000, and preferably from 20,000 to 300,000; the number average molecular weight of the unsaturated aromatic polymer block A in the block copolymer rubber is from 1,000 to 200,000, and preferably from 2,000 to 100,000; the number average molecular weight of the conjugated diene polymer block B is from 1,000 to 200,000, and preferably from 2,000 to 100,000; and the weight ratio of the unsaturated aromatic polymer block A to the conjugated diene polymer B is from 2/98 to 60/40, and preferably from 10/90 to 40/60.

As the production method for block copolymer rubbers, various methods have been proposed, but as a typical method, a block copolymer rubber of an unsaturated aromatic hydrocarbon and a diene hydrocarbon can be obtained by block polymerizing them in an inert solvent using a lithium catalyst or a Ziegler type catalyst according to the method described in JP-B-40-23798.

The hydrogenation treatment of the block copolymer rubber thus obtained is carried out by the methods described, e.g., in JP-B-42-8704, JP-B-43-6636, and JP-B46-20814 in an inert solvent in the presence of a hydrogenation catalyst. The hydrogenation ratio is at least 50%, and preferably at least 80% of the polymer block B, and not more than 25% of the aromatic unsaturated bonds in the polymer block A is subjected to nuclear hydrogenation. The thus partially or completely hydrogenated block copolymer is typically commercially available as a trade name of KRATON ®-G from Shell Chemical Co., U.S.A.

For graft copolymerizing a graft monomer to a rubbery material as a raw material in the production method of the modified rubbery material, various known methods can be employed.

For example, there are a method for mixing the rubbery material as the raw material with a graft monomer and a radical initiator and melt kneading the mixture in a melt kneader to effect grafting; a method for dissolving an ethylenic copolymer rubber in an organic solvent such as xylene, adding thereto a radical initiator, reacting the mixture by heating with stirring in a nitrogen gas atmosphere, and after the reaction is over, cooling, washing, filtering, and drying the reaction product to provide a grafted ethylenic copolymer rubber; a method for irradiating an ethylenic copolymer rubber with an ultraviolet light in the presence of a graft monomer; and a method for contacting an ethylenic copolymer rubber with oxygen or ozone.

In these methods, the method for graft copolymerizing by melt kneading the foregoing mixture in a melt kneader is most preferably used from the viewpoint of economy.

In the present invention, the modified rubbery material can be obtained by melt kneading a rubbery material as a raw material with an unsaturated carboxylic acid or a derivative thereof in the optional presence of a radical initiator, or with an unsaturated carboxylic acid or a derivative thereof and an unsaturated aromatic monomer in the optional presence of a radical initiator at a temperature of from 200 to 280° C., and from 230 to 260° C., for a residence time of from 0.2 to 10 min., which differs according to the kind of the radical initiator, using an extruder, a Banbury mixer, and a kneader.

If oxygen exists too much at kneading, it sometimes happens that a gel-like material forms or the product is greatly colored and, hence, it is preferable to knead them in the substantial absence of oxygen.

Also, if the kneading temperature is lower than 200° C., a desired addition amount of the unsaturated carboxylic acid anhydride is not obtained, and a little effect only for improving the graft reaction amount is obtained. Also, even if the kneading temperature is over 280° C., the effect for the improvement of the graft reaction amount is small, and as the case may be, the formation of a gel-like material, coloring, etc., occur, which are also undesirable.

There is no particular restriction on the kneader for the modification, but from the standpoint that continuous production can be made, the use of an extruder is generally preferred, and it is desirable that the extruder is of a uniaxial or biaxial type and has a screw(s) suitable for uniformly mixing various raw materials.

For removing unreacted components (the unsaturated carboxylic acid or derivative thereof, the unsaturated aromatic monomer, the radical initiator, etc.) and the side-reaction products such as oligomers of the foregoing components and decomposition products thereof from the reaction product, a method for removing by sucking them by means of a vacuum pump at the intermediate portion thereof or near the outlet thereof, or a method for dissolving the reaction mixture in a suitable solvent and purifying by precipitating the reaction product can be used. Also, the reaction mixture obtained can be heat treated at a temperature of at least 60° C. or sucking by a vacuum pump under melting can be applied.

At supplying the foregoing three components or four components, each component may be separately supplied, but a part of the components or all the components can be previously uniformly mixed before supply.

For example, a method for impregnating a rubber with the unsaturated aromatic monomer together with a radical initiator and simultaneously feeding the rubber and the unsaturated carboxylic acid or derivative thereof, etc., followed by kneading can be employed. Also, a method for modifying the rubbery material by supplying the radical initiator and/or the unsaturated carboxylic acid or derivative thereof into the extruder from the intermediate portion thereof can be used.

Also, to the modified rubbery material can be added, if desired, various additives such as antioxidants, heat stabilizers, light stabilizers, nucleating agents, lubricants, antistatic agents, inorganic or organic coloring agents, rust preventives, crosslinking agents, foaming agents, plasticizer, fluorescent agents, surface smoothening agents, and surface gloss improving agents, during the production step thereof or in a processing step after the production thereof.

The unsaturate carboxylic acid or derivative thereof and the radical initiator which are used for producing the modified rubbery material can be selected from compounds which are usually used for producing graft polypropylene resins.

Also, as the unsaturated aromatic monomer, styrene is most preferably used, but o-methylstyrene, p-methylstyrene, α-methylstyrene, vinyltoluene, divinylbenzene, etc., can be used. They may be used alone or in admixture.

In the production of the modified rubbery material, the unsaturated aromatic monomer is used for the purposes of preventing the formation of gels and improving the graft reaction amount.

The amount of the unsaturated aromatic monomer used is preferably from 0.2 to 20 parts by weight per 100 parts by weight of the raw material rubbery material, and the amount of the unsaturated carboxylic acid or derivative thereof used is preferably from 0.5 to 15 parts by weight per 100 parts by weight of the raw material rubbery material. In the case of using the unsaturated aromatic monomer, the amount of the unsaturated carboxylic acid or derivative thereof used is from 0.5 to 15 parts by weight per 100 parts by weight of the raw material rubbery material, and the weight ratio of the unsaturated aromatic monomer to the unsaturated carboxylic acid or derivative thereof is from 0.1 to 3.0, and more preferably from 0.5 to 2.0.

If the amount of the unsaturated aromatic monomer used is less than 0.1 part by weight per part by weight of the unsaturated carboxylic acid or derivative thereof, the effects of preventing the formation of gels and of improving the graft reaction amount are not obtained, while if the amount the unsaturated aromatic monomer used is over 3.0 parts by weight, further preferred effects cannot be expected.

The amount of the radical initiator used depends upon the kind of the radical initiator and kneading condition but is usually in the range of from 0.005 to 1.0 part by weight, and preferably from 0.01 to 0.5 part by weight, per 100 parts by weight of the raw material rubbery material.

If the amount of the radical initiator used is less than 0.005 part by weight, the desired addition amount of the unsaturated carboxylic acid or derivative thereof is not obtained, and also, the effect of increasing the addition amount of the unsaturated carboxylic acid or derivative thereof by the use of the unsaturated aromatic monomer becomes little. Also, if the amount of the radical initiator is over 1.0 part by weight, the formation of gellike products undesirably occurs.

In the modified rubbery material thus obtained, it is preferable that the addition amount of the unsaturated carboxylic acid or derivative thereof is from 0.1 to 5% by weight, the addition amount of the unsaturated aromatic monomer is from 0.1 to 5% by weight, and the Mooney viscosity ($ML_{1+4}$, 121° C.) is from 5 to 120.

As another method which is used in the production of the modified rubbery material, there is a method for copolymerizing the unsaturated carboxylic acid or derivative thereof into the main chain in the presence of a polymerization initiator and a catalyst. In general, the highpressure radical polymerization method described below can be used for the production. That is, the modified rubbery material is obtained by copolymerizing ethylene and a comonomer capable of radical copolymerizing with ethylene using a free radical generating agent such as an organic peroxide and oxygen. The copolymerization reaction is usually carried out at a polymerization temperature of from 130° to 300° C. and under a polymerization pressure of from 500 to 3,000 kg/cm².

Examples of the comonomer capable of radical-copolymerizing with ethylene are unsaturated carboxylic acids such as acrylic acid and methacrylic acid, esterification products of unsaturated carboxylic acids, and vinyl esters such as vinyl acetate. Specific examples of the esterification products of unsaturated carboxylic acids are methyl acrylate, ethyl acrylate, methyl methacrylate, and glycidyl methacrylate. These comonomers may be used singly or in admixture.

In addition, of these copolymers, rubbery materials and those illustrated above as the ethylene copolymer rubbers of the rubbery materials as the raw materials for the modified rubbery materials are omitted from the modified rubbery materials.

The content of the comonomer in the modified rubbery material obtained by direct copolymerization in the range of from 0.1 to 40% by weight, and preferably from 1 to 35% by weight. If the content of the comonomer is less than 0.1% by weight, the improving effect is not obtained.

Of these copolymers, an ethylene-acrylic acid copolymer, an ethylene-methacrylic acid copolymer, an ethylene-glycidyl methacrylate copolymer, and an ethylene-glycidyl methacrylate-vinyl acetate copolymer are preferred.

Then, inorganic fillers and glass fibers are explained.

(C) Inorganic Fillers and Glass Fibers

First, as the inorganic filler for use in the present invention, talc (magnesium silicate), clay (aluminum silicate), zinc oxide, titanium oxide, calcium carbonate, etc. can be used. A preferred mean particle size of the inorganic filler is not larger than 5.0 $\mu$m, and it is more preferred that the inorganic filler has a mean particle size of not more than 5.0 $\mu$m and an aspect ratio is at least 5. A preferred inorganic filler is talc.

The inorganic filler may be used without being treated, but for improving the interfacial adhesion with a polypropylene resin or improving the dispersibility of the inorganic filler, the surface of the inorganic filler can be treated with various kinds of silane coupling agents, titanium coupling agents, higher fatty acids, higher fatty acid esters, higher fatty acid amides, higher fatty acid salts, or other surface active agents.

Glass fibers which are used in the present invention are used together with the inorganic filler or are used singly.

The glass fibers can be used with various coupling agents for improving the interfacial adhesion with a polypropylene resin and the dispersibility of the glass fibers. The coupling agents usually include silane coupling agents and titanium coupling agents.

(D) Compounding Ratio

In the present invention, as to the compounding ratio with the polypropylene resin selected from a polypropylene and an ethylene-propylene block copolymer, in the case of adding the rubbery material or modified rubbery material, the compounding ratio of the rubbery material or modified rubbery material is not more than 100 parts by weight, and preferably not more than 70 parts by weight, per 100 parts by weight of the polypropylene resin. If the compounding ratio is over 100 parts by weight, the toughness, heat resistance, etc., are undesirably reduced.

Also, when the inorganic filler and/or glass fibers are added, the addition amount thereof is not more than 50 parts by weight per 100 parts by weight of the polypropylene resin.

In the case of not containing the inorganic filler and/or glass fibers, the heat resistance, rigidity, and dimensional stability of the polypropylene resin molding are inferior, but the impact resistance thereof is improved. The case of containing over 50 parts by weight of the inorganic filler and/or glass fibers, the impact resistance of the polypropylene resin molding is undesirably greatly reduced. Thus, the content of the inorganic filler and/or glass fibers is more preferably not more than 30 parts by weight. In the case of using both the inorganic filler and the glass fibers, the weight ratio of the inorganic filler to the glass fibers is from 20/80 to 80/20.

Furthermore, the thermoplastic resin composition according to the present invention may further contain, if desired, pigments, ultraviolet light absorbents, heat stabilizers, flame retarders, antioxidants, plasticizers, etc.

Also, as the matter of course, the rubbery material or modified rubbery material and the inorganic filler and/or glass fibers can be simultaneously added to the polypropylene resin.

(E) Mixing Method and Molding Method

There is no particular restriction on the method for producing the thermoplastic resin composition for use in the present invention, and ordinary known methods can be used.

A method for mixing the components in a solution state and evaporating off the solvent or precipitating the resin composition in a non-solvent is also effective but actually, a method for kneading the components in a molten state is generally used from the industrial viewpoint. For the melt kneading, kneaders generally used, such as a Banbury mixer, an extruder, rolls, and various kinds of kneaders, can be used.

It is preferably that the resin components are preliminarily mixed uniformly in the form of a powder or pellet in a mixing apparatus, e.g., a tumbling mixer and a Henschel mixer. If desired, preliminary mixing may be omitted, and each resin component may be separately fed to a kneading machine.

The resulting resin composition is molded by various molding methods such as injection molding and extrusion molding. The present invention also embraces an embodiment in which the constituting components are dry blended at the time of injection molding or extrusion molding without having been previously kneaded and directly kneaded during a melt molding operation to obtain a molding.

Then, the coating method for the present invention is explained.

(F) Coating Method

In the present invention, the surface of the foregoing polypropylene resin molding is, or after being coating the surface of the molding with a primer, irradiated with an ultraviolet light.

In this case, the form of the polypropylene resin molding may be various forms such as films, plates, and fibers.

The light irradiating the surface of the molding is a light having a wavelength of 300 nm or less, and in particular an ultraviolet light having wavelengths of 254 nm and 185 nm as the main active wavelengths, and the intensity thereof is preferably strong.

In the present invention, before irradiating the surface of the polypropylene resin molding with an ultraviolet light, degreasing may be applied to the surface as well known.

As the solvent for degreasing the surface of the polypropylene resin molding, water, an aqueous solution of an alkali, etc., and an alcohol such as ethanol and isopropanol can be used.

As a method for contacting the surface of the polypropylene resin molding with the solvent, methods by coating, wiping, spraying, etc. can be employed. Also, a method for power washing with an aqueous solution of an acid or an alkali may be employed.

The primer which can be used in the present invention is a solution containing at least one kind of an olefinic high-molecular weight compound having at least one polar group shown by —X—, —OCOR, —COOR, —OR,

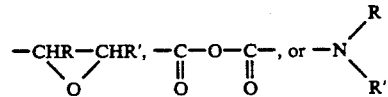

(wherein X represents a halogen atom; and R and R' each represents a hydrogen atom or a hydrocarbon group having from 1 to 8 carbon atoms) as a vehicle.

As the solvent which is used, aromatic hydrocarbons such as toluene and xylene, acetic acid esters such as ethyl acetate and isobutyl acetate, ketones such as methyl ethyl ketone and methyl isobutyl ketone, and alcohols such as ethanol, isopropanol, and butanol can be used. These solvents can be used singly or in admixture.

The ratio of the polar group portion of the olefinic high-molecular weight compound which is used as a vehicle in the primer is preferably from 1 to 60% by weight based on the solids content. If the ratio is less than 1% by weight, the effect of the polar group is poor, whereby the primer is reluctant to adhere to urethane finishing coating materials, while if the ratio is over 60% by weight, the proportion of the polar group is too much so that the primer is reluctant to adhere to moldings composed of the polyolefin composition. Also, for improving the adhesion, a combination of two or more kinds of these polar groups may be used.

Examples of such an olefinic high-molecular weight compound include chlorinated polyethylene, brominated polyethylene, chlorinated polypropylene, chlorination products or maleic anhydride-modification products of an ethylene-propylene copolymer, ethylene-vinyl acetate copolymers or partial saponification products thereof, maleic anhydride-modification products of an ethylene-vinyl acetate copolymer, ethylene-(meth)acrylic acid copolymers, ethylene-(meth)acrylic acid ester copolymers or partial hydrolyzates thereof, ethylene-maleic anhydride copolymers or partial hydrolyzates or partial esterification products thereof, ethylene-glycidyl methacrylate copolymers or partial ring-opening products thereof with an organic acid, primary amine, or secondary amine, acrylic acid-modification products of polypropylene, and ethylene-dialkylaminoethyl methacrylates.

Of these compounds, chlorinated polypropylene and maleic anhydride-modification products of an ethylene-propylene copolymer are preferred.

As a coating method, a method for dipping the polypropylene resin molding in a coating liquid and a method for coating thereon a coating liquid with a doctor knife can be used, but a spray coating method is generally employed.

In the present invention, the irradiation time of an ultraviolet light is from 10 seconds to 10 min., and preferably from 30 seconds to 5 min. If the irradiation time is shorter than 10 seconds, the effect of improving the coating properties for the resin molding is insufficient, while if the irradiation time is longer than 10 min., not only the process is economically disadvantageous, but also the deterioration of the resin surface an the primer coated surface occur to give a reverse effect.

According to the invention, after irradiating the surface of the polypropylene resin molding with an ultraviolet light and coating the irradiated surface with a primer, or after coating the surface of the resin molding with a primer and irradiating the coated surface with an ultraviolet light, the surface of the molding can be coated with an acrylic or urethane coating material.

Preferred examples of the coating material used in the present invention include epoxy coating materials, polyester coating materials, acrylic coating materials, and urethane coating materials.

In particular, urethane coating materials have flexibility and, hence, are being generally used for parts of automobiles and motorbikes.

As the urethane coating material, coating materials having a urethane structure, such as acrylic urethane, polyester urethane, and modified urethane, can be used.

Then, the invention is further explained practically by the following examples, but the invention is not limited to these examples.

(1) Polypropylene resins used as the raw materials in Examples and Comparative Examples:
1) Homopolypropylene:
Sumitomo Noblen® H501 (a trade name of Sumitomo Chemical Company, Limited)
Melt flow rate (MFR)=3.5 (g/10 min.) (measured according to JIS K6758) (hereinafter referred to "homo PP")
2) Propylene-ethylene block copolymer:
Melt flow rate (MFR)=20 (g/10 min.)
Ethylene content=7% by weight
Ethylene content of the propylene-ethylene copolymer portion=47% by weight
$[\eta]$ in 135° C. tetralin=5 (intrinsic viscosity at 135° C. in a solution of tetralin) (hereinafter referred to as "block PP")

(2) Coating properties evaluation method (Initial adhesion of coating):
The surface of a molding to be measured was coated with a coating material, the coated layer of the sample was notched by a blade to form 100 squares of 2 mm×2 mm each, and when an adhesive tape (Cello Tape®, a trade name of Nichiban Company, Limited) having a width of 24 mm was stuck onto the squares while pressing by fingers and the adhesive tape was then peeled off at a stretch from the end, the number of squares remained was evaluated as a residual ratio (%).

EXAMPLE 1

The pellets of the afore-mentioned homo PP were molded using a 10-ounce injection molding machine (150E-V Type, a trade name of Toshiba Machine Co., Ltd.) at a molding temperature of 250° C. and a mold temperature of 50° C. to form a tabular molding.

The molding thus obtained was placed in front of an ultraviolet light irradiation apparatus equipped with a low-mercury vapor pressure lamp (made by synthetic quartz, 200 watts), and the surface treatment was carried out by irradiating the surface of the molding with an ultraviolet light (UV) having wavelengths of 254 nm and 185 nm as the main acting wavelengths in an air atmosphere while keeping the distance between the light source and the surface of the molding at about 15 cm for 60 seconds.

(Irradiation intensity=560 mJ/cm$^2$, wavelength: 254 nm)

Then, after spray coating the surface of the molding with a chlorinated polypropylene primer RB123M (a trade name of Nippon Bee Chemical Co., Ltd.), the coated molding was further spray coated with an acrylic urethane coating material, R271 (a trade name of Nippon Bee Chemical Co., Ltd.), the coated molding was dried by baking at 90° C. for 30 min., and the initial adhesion of the coated molding was then measured. The results obtained are shown in Table 1 below.

COMPARATIVE EXAMPLE 1

By following the same procedures as in Example 1 except that the irradiation of the an ultraviolet light was not applied, the initial adhesion of the coated molding was measured. The results are shown in Table 1 below.

COMPARATIVE EXAMPLE 2

By following the same procedures as in Example 1 except that the primer coating was not applied, the initial adhesion of the coated molding was measured. The results are shown in Table 1 below.

EXAMPLE 2

By following the same procedures as in Example 1 except that block PP was used as the polypropylene resin, the initial adhesion of the coated molding was measured. The results are shown in Table 2 below.

COMPARATIVE EXAMPLE 3

By following the same procedures as in Example 2 except that the irradiation of the ultraviolet light was not applied, the initial adhesion of the coated molding was measured. The results are shown in Table 2 below.

COMPARATIVE EXAMPLE 4

By following the same procedures as in Example 2 except that the primer coating was not applied, the initial adhesion of the coated molding was measured. The results are shown in Table 2 below.

TABLE 1

|  | Resin | Coating Step | | | Initial Adhesion of Coated Molding |
|---|---|---|---|---|---|
|  |  | Surface Treatment | Primer | Coating Material |  |
| Example 1 | Homo PP | UV Irradiation | RB123M | R271 | 99.4 |
| Comparative Example 1 | " | — | " | " | 0 |
| Comparative Example 2 | " | UV Irradiation | — | " | 0 |

TABLE 2

| | | Coating Step | | | Initial Adhesion of Coated Molding |
|---|---|---|---|---|---|
| | Resin | Surface Treatment | Primer | Coating Material | |
| Example 2 | Block PP | UV Irradiation | RB123M | R271 | 99.6 |
| Comparative Example 3 | " | — | " | " | 0 |
| Comparative Example 4 | " | UV Irradiation | — | " | 0 |

As described above, according to the present invention, by applying the ultraviolet light irradiation onto the surface of a polypropylene resin molding, a primer can be used without need of applying a surface treatment with a halogenated hydrocarbon and, thus, a coating method of polypropylene resin moldings giving very excellent coating properties can be provided.

While the invention has been described in detail and with reference to specific embodiments thereof, it will be apparent to one skilled in the art that various changes and modifications can be made therein without departing from the spirit and scope thereof.

What is claimed is:

1. A method for coating a polypropylene resin molding, which comprises irradiating the surface of a molding of a polypropylene resin selected from a polypropylene and a propylene-ethylene block copolymer with an ultraviolet light having an irradiating wavelength in the region of 300 nm or less, coating the irradiated surface with a primer, and further coating the coated surface with a coating material, wherein said primer contains chlorinated polypropylene, and wherein said coating material is a urethane coating material.

* * * * *